Nov. 17 1925.
J. E. WOODBURY
1,562,133
FRONT WHEEL BRAKE FOR AUTOMOBILES
Filed March 3, 1922
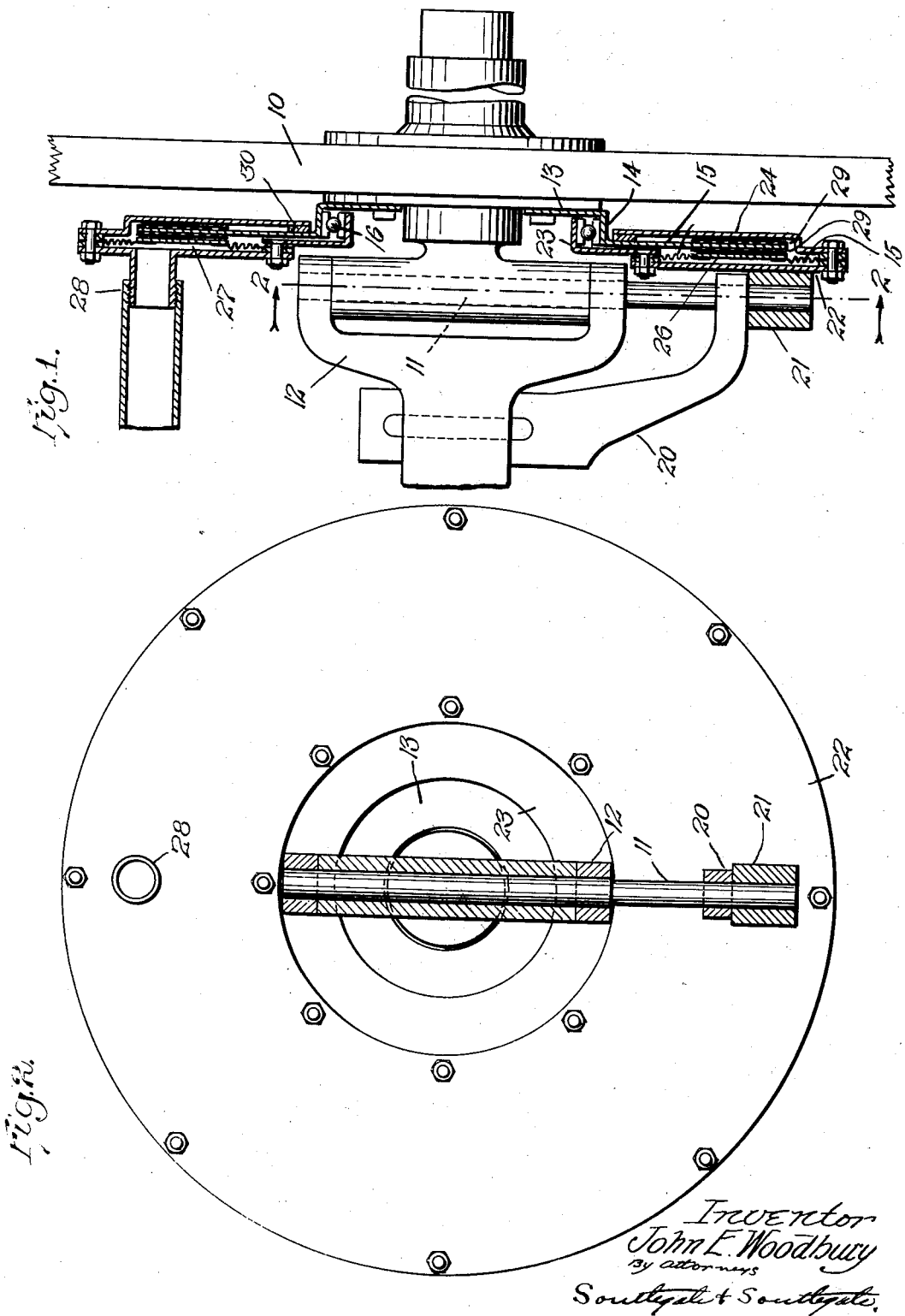
Inventor
John E. Woodbury
by attorneys
Southgate & Southgate Patented Nov. 17, 1925.

1,562,133

UNITED STATES PATENT OFFICE.

JOHN E. WOODBURY, OF WORCESTER, MASSACHUSETTS.

FRONT-WHEEL BRAKE FOR AUTOMOBILES.

Application filed March 3, 1922. Serial No. 540,846.

*To all whom it may concern:*

Be it known that I, JOHN E. WOODBURY, a citizen of the United States, residing at Worcester, in the county of Worcester and State of Massachusetts, have invented a new and useful Front-Wheel Brake for Automobiles, of which the following is a specification.

This invention relates to a safety device for an automobile in the form of a front wheel brake.

The principal objects of the invention are to provide a front wheel brake for use on high speed cars which will be light, strong and neat; to provide it in such a form that it will be absolutely free from rattle, will have good cooling qualities, will not require adjustment, and will be free from drag; and especially to provide means whereby the turning of the front wheels will not cause the brake to be applied and an application of the brake will cause no disturbing influence on the steering of the car. The invention preferably is employed in connection with an ordinary brake on the rear wheels to be operated by the same lever although that is not essential.

Further objects and advantages of the invention will appear hereinafter.

Reference is to be had to the accompanying drawings, in which

Fig. 1 is a central diametrical sectional view of a front wheel brake constructed in accordance with this invention, and Fig. 2 is a sectional view on the line 2—2 of Fig. 1, showing most of the parts in elevation.

The value of the front wheel brake as a safety device is well understood but it has not been adapted generally because of the difficulty of securing the above mentioned objects.

Referring to the drawings, I have shown the invention as applied to a front wheel 10 swiveled as usual on the king pin 11 which is arranged radially and is supported by the axle 12.

On the inner side of the wheel, preferably secured around the hub thereof, is mounted a plate 13 of circular form provided with a right angle shoulder 14 and with an integral circular disc 15 beyond it. This disc therefore rotates positively with the hub of the wheel. This disc 15 is shown as flat. This plate 13—14—15 preferably is stamped out of sheet steel and provided in the stamping process with a form that permits the mounting of one race of an annular ball bearing 16 inside the shoulder 14. Fixed on both sides of the disc 15 I provide annular brake linings 29.

Swiveled on the extension of the king pin 11 is a boss 21 which, therefore, is free to turn on the axis of the pin, that is, on the axis on which the wheel turns in steering. These parts are shown as steadied by an arm 20 mounted on the axle. This boss is fixed on a pressed metal plate 22 of annular form. To this plate is secured a housing plate 23 also formed preferably of sheet metal having an inset at the end accommodating the other half of the ball race 16, which constitutes the support for these two plates. As the plates 22 and 23 are incapable of turning on the axis of the wheel, the ball race is provided to steady the connection of these parts with the steel disc 15 which turns with the hub.

The plate 22 is provided with a suitable pair of annular corrugated elastic rings 25, one located nearer the center than the other but in the same plane. They are secured to the flat stamping 22 and support a floating annular steel friction disc 26. The space 27 between the parts 22 and 26 and bounded also by the rings 25 constitutes an air space. Air or other fluid is supplied to this through a connection 28, or in any other desired way, to force the disc 26 toward the friction disc 15. Fixed to the plate 22 by a series of bolts, or the like, is an outer steel annular friction housing plate 24.

The ordinary brake pedal or lever, or if desired, an emergency lever is provided with means for introducing fluid under pressure through the connection 28. This is not shown herein but may consist of a cylinder and piston for putting the fluid under pressure when the lever or pedal is depressed and forcing it into the space 27. When this happens, the parts 26 and 22 are forced apart to exert pressure against both of the brake linings 29 and cause the brake action to take place between the housing 24 and disc 26 and the disc 15 with the brake linings between. The elasticity of these parts is sufficient to equalize the pressure between the inner and outer rings of the brake so that the retarding influence is evenly distributed throughout the friction surface. As the brake lingings are mounted on the disc 15 the friction areas are located on the inner surfaces of the plates 24 and 26 so that they are cooled by the external air. A ring 30 is provided to protect from dust, etc.

When the brake pedal is released the fluid in the space 27 escapes through the connection 28 and the friction between the surfaces is at once released. As the wheel 10 turns after the pressure is released, the disc 15 runs freely within the annular ball bearing which supports the non-rotating housing plate 23. This, independently of the turning of the wheel, will exert no appreciable drag upon the disc because it turns on the pin 11 with the wheel. The outer housing 24 swivels freely on this pin, thus exerting no disturbing influence on the car steering.

By supporting the entire housing 23 on the disc 15 the installation and service of the brake are greatly simplified, as the brake is removable with the hub whether that is an integral part of the wheel or not. The parts are easy to make and assemble and to keep accurate and free from drag.

This construction provides a brake that, in the hands of the user, will have greatest durability without adjustment, will be free from drag during steering, will have good cooling qualities because entirely exposed to the air, will be neat in appearance and out of the way, and throughout its use will remain free from rattling. The design can be made light and strong and most of the parts can be made of pressed metal. With such a brake, an operator of a high speed car can come to rest in half the space now required which adds materially to the safety of operation and is now really necessary in view of the speed at which cars are constantly being driven.

Although I have illustrated and described only a single form of the invention, I am aware of the fact that modifications can be made therein by any person skilled in the art without departing from the scope of the invention as expressed in the claims. Therefore, I do not wish to be limited to all the details of construction herein shown and described, but what I do claim is:—

1. In a front wheel brake for vehicles, the combination of a disc forming one element of the brake fastened on the front wheel, and another housing supported by the disc and provided with a friction element.

2. In a front wheel brake for vehicles, the combination of a metal disc forming one element of the brake fastened rigidly on the wheel, an outer housing plate supported by the disc, a pivoted non-rotatable housing, and another friction element of the brake mounted on the non-rotatable housing.

3. In a vehicle brake, the combination with the front wheel of the vehicle, its axle and king pin, of a bearing concentric with said wheel, a housing supported on said bearing and rotatable relatively to it and having a pivoted connection in line with the king pin, and means fixedly connected with the front wheel for cooperating with said housing to provide the brake action.

4. In a vehicle brake, the combination with an axle having a pivoted bearing, of a bearing concentric with the front wheel of the vehicle, a housing supported on the last named bearing rotatable relatively thereto and pivoted to the axle on an axis in line with the pivoted bearing of the axle, and means carried by the front wheel for cooperating with said housing to provide the brake action.

5. In a front wheel brake, the combination with a friction disc mounted on the front wheel hub, of a housing concentric therewith, pivoted on a radial axis, and provided with fluid pressure operated means on one side of the disc for applying pressure thereto to create friction on both sides.

6. In a front wheel brake for automobiles, the combination with the front wheel hub, its axle, bearing and king pin, of a housing concentric with the front wheel bearing and oscillatable on an axis concentric with the king pin bearing, said housing having a frictional surface fixedly connected therewith, and a frictional surface movably connected therewith, a diaphragm connecting the movable surface with the housing and forming a closed chamber, means for introducing fluid under pressure into said chamber, and a disc mounted on the wheel between said friction surfaces.

7. In a front wheel brake for automobiles, the combination with the front wheel, its axle, bearing and king pin, of a housing concentric with the front wheel bearing and oscillatable on an axis concentric with the king pin bearing, said brake having two relatively movable friction members, one located between the other one and said housing, and a diaphragm connecting one of said members with the housing and forming a closed chamber therewith whereby the introduction of fluid under pressure into said chamber will cause one of said friction members to move toward the other, one of said friction members being mounted on the wheel to receive the pressure, thereby exerting a braking action on the wheel.

8. In a front wheel brake for automotive vehicles, the combination of a front axle, king pin and steering knuckle and a wheel and brake unit, the wheel and brake being rotatively attached to one another, and adapted to be secured in place on the axle spindle.

9. In a front wheel brake for automotive vehicles, the combination of a wheel and brake rotatively attached one to the other forming a unit and adapted to be easily secured to the axle spindle, the wheel and brake shoe being free to turn, subject only to braking action, and a brake housing secured against rotation.

In testimony whereof I have hereunto affixed my signature.

JOHN E. WOODBURY.